(12) United States Patent
Buendia et al.

(10) Patent No.: US 9,157,177 B2
(45) Date of Patent: Oct. 13, 2015

(54) LAUNDRY TREATING APPLIANCE AND METHOD OF CONTROL

(75) Inventors: Ali R. Buendia, Saint Joseph, MI (US); Karl David McAllister, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 945 days.

(21) Appl. No.: 13/332,951

(22) Filed: Dec. 21, 2011

(65) Prior Publication Data

US 2013/0160216 A1 Jun. 27, 2013

(51) Int. Cl.
*D06F 33/02* (2006.01)
*D06F 37/30* (2006.01)
*D06F 39/00* (2006.01)

(52) U.S. Cl.
CPC .............. *D06F 33/02* (2013.01); *D06F 37/304* (2013.01); *D06F 39/003* (2013.01); *D06F 2202/06* (2013.01); *D06F 2204/06* (2013.01); *Y02B 40/52* (2013.01)

(58) Field of Classification Search
CPC ..... D06F 33/02; D06F 39/003; D06F 37/304; D06F 2202/06; D06F 2204/06
USPC ...................... 8/158, 159; 68/12.04, 12.23, 24
See application file for complete search history.

(56) References Cited

U.S. PATENT DOCUMENTS

| | | | |
|---|---|---|---|
| 5,335,524 A | 8/1994 | Sakane | |
| 6,381,791 B1 | 5/2002 | French et al. | |
| 6,397,422 B1 | 6/2002 | Maziere | |
| 6,581,230 B2 | 6/2003 | Weinmann | |
| 6,834,407 B2 | 12/2004 | Stephens | |
| 7,471,054 B2 | 12/2008 | Marioni | |
| 8,499,392 B2 * | 8/2013 | Suel et al. ........... | 8/159 |
| 2004/0211009 A1 * | 10/2004 | Murray et al. ..... | 8/159 |
| 2005/0204482 A1 * | 9/2005 | Murray et al. ..... | 8/158 |
| 2007/0113598 A1 * | 5/2007 | Jun et al. ........... | 68/140 |
| 2008/0115295 A1 * | 5/2008 | Vadakkeveedu et al. ......... | 8/159 |
| 2009/0266113 A1 * | 10/2009 | Musser et al. ............... | 68/12.06 |
| 2010/0000022 A1 | 1/2010 | Hendrickson et al. | |
| 2010/0000024 A1 | 1/2010 | Hendrickson et al. | |
| 2010/0000264 A1 | 1/2010 | Luckman et al. | |
| 2010/0000573 A1 | 1/2010 | Hendrickson et al. | |
| 2010/0000581 A1 | 1/2010 | Doyle et al. | |
| 2010/0000586 A1 | 1/2010 | Hendrickson | |
| 2010/0251487 A1 | 10/2010 | Bolduan et al. | |
| 2010/0263136 A1 | 10/2010 | Ashrafzadeh et al. | |
| 2011/0016738 A1 | 1/2011 | Ashrafzadeh et al. | |
| 2011/0030149 A1 | 2/2011 | Cho et al. | |
| 2011/0030150 A1 | 2/2011 | Ashrafzadeh et al. | |
| 2011/0113569 A1 * | 5/2011 | Ashrafzadeh et al. ............ | 8/159 |
| 2012/0266389 A1 | 10/2012 | Ihne et al. | |

FOREIGN PATENT DOCUMENTS

| | | |
|---|---|---|
| DE | 3436786 A1 | 4/1986 |
| DE | 4205816 A1 | 9/1993 |
| DE | 19819554 A1 | 11/1999 |

(Continued)

OTHER PUBLICATIONS

German Search Report for DE102012110180, Jul. 22, 2013.

*Primary Examiner* — Joseph L Perrin

(57) ABSTRACT

A method of operating a laundry treating appliance to control a rotational speed of a drum to move the laundry within the drum according to a predetermined category of movement.

11 Claims, 5 Drawing Sheets

(56) References Cited

FOREIGN PATENT DOCUMENTS

| | | |
|---|---|---|
| DE | 102007057331 A1 | 6/2009 |
| DE | 102010016454 A1 | 2/2011 |
| DE | 102010016875 A1 | 2/2011 |
| EP | 0219422 A1 | 4/1987 |
| EP | 0428469 A2 | 5/1991 |
| EP | 1103648 A2 | 5/2001 |
| EP | 1734167 A1 | 12/2006 |
| FR | 2655363 A1 | 6/1991 |
| JP | 2009066095 A | 4/2009 |
| JP | 2009297123 A | 12/2009 |
| WO | 2006129157 A1 | 12/2006 |

* cited by examiner

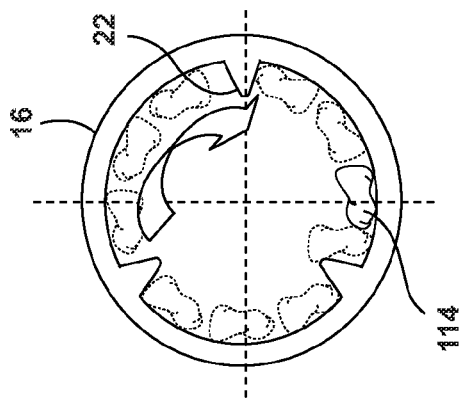
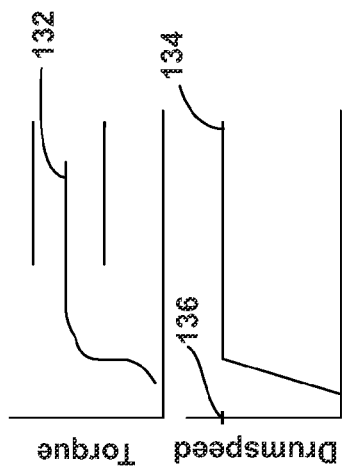
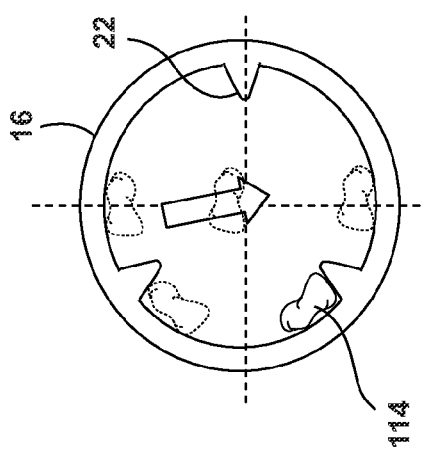
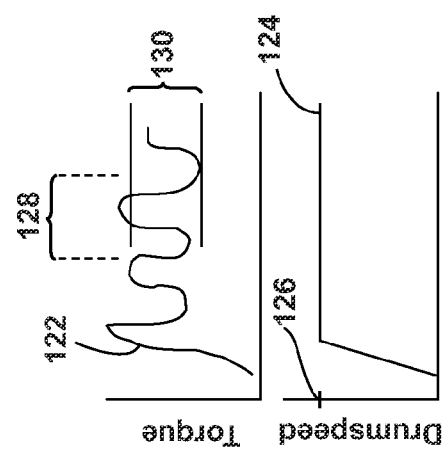
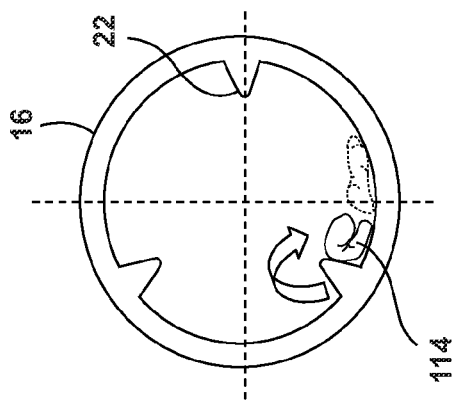
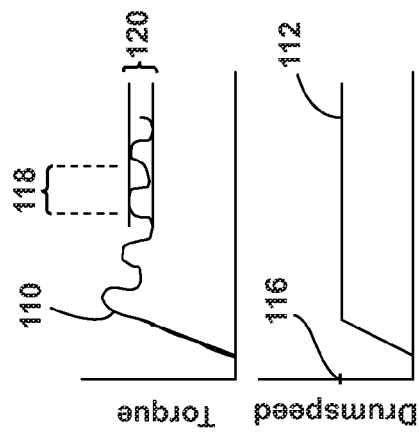
Fig. 4
Fig. 5
Fig. 6

LAUNDRY TREATING APPLIANCE AND METHOD OF CONTROL

BACKGROUND

Laundry treating appliances, such as clothes washers, refreshers, and non-aqueous systems, may have a configuration based on a rotating drum that defines a treating chamber in which laundry items are placed for treating. The laundry treating appliance may have a controller that implements a number of pre-programmed cycles of operation having one or more operating parameters. The controller may control a motor to rotate the drum according to one of the pre-programmed cycles of operation. The controller may control the motor to rotate the drum at the same speeds for a give pre-programmed cycle of operation regardless of the characteristics of the laundry items or changes in the system.

BRIEF SUMMARY

According to an embodiment of the invention, a method of operating a laundry treating appliance having a drum at least partially defining a treating chamber for receiving a laundry for treatment, a motor operably coupled to and rotating the drum, a controller coupled to and controlling the motor, and a user interface operably coupled to the controller, wherein the controller controls the motor according to a cycle of operation selected via the user interface, comprises establishing a desired movement of the laundry within the treating chamber, controlling the speed of the motor to control the rotational speed of the drum by the controller providing a speed control signal to the motor and receiving by the controller a torque signal indicative of the torque of the motor. The controller may monitor the amplitude and frequency of a ripple in the torque signal, determine a category of movement of the laundry from a predetermined group of movement categories based on the monitored amplitude and frequency, and control the speed of the motor until the determined movement of the laundry satisfies the desired movement of the laundry.

BRIEF DESCRIPTION OF THE DRAWINGS

In the drawings:

FIG. 4 is a schematic illustration of a motor torque and drum speed signal corresponding to a movement of an article of laundry in a drum of a washing machine according to a third embodiment of the invention.

FIG. 5 is a schematic illustration of a motor torque and drum speed signal corresponding to a movement of an article of laundry in a drum of a washing machine according to a fourth embodiment of the invention.

FIG. 6 is a schematic illustration of a motor torque and drum speed signal corresponding to a movement of an article of laundry in a drum of a washing machine according to a fifth embodiment of the invention.

DETAILED DESCRIPTION

Figure 1:
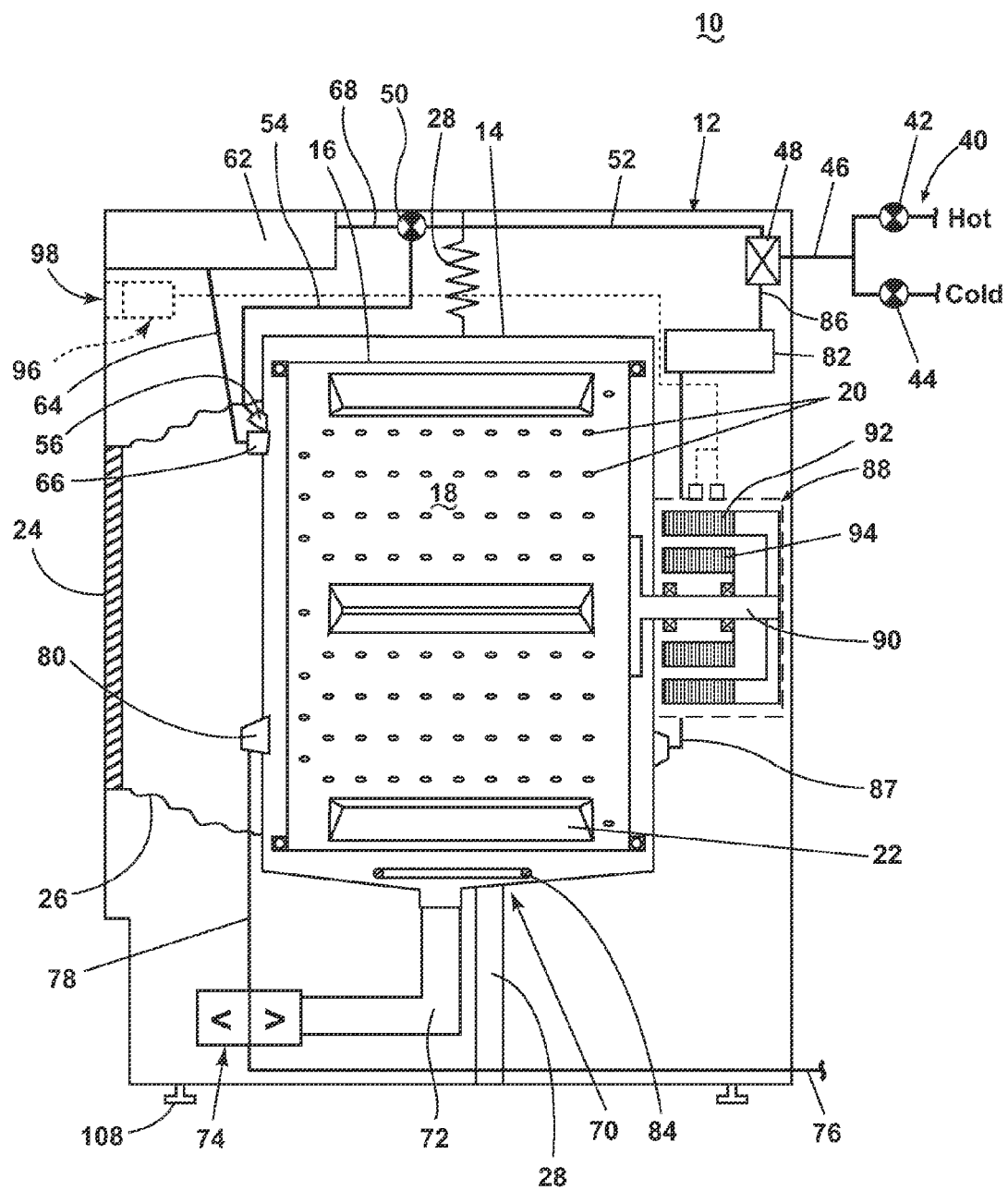
FIG. 1 is a schematic view of a laundry treating appliance in the form of a washing machine according to a first embodiment of the invention.

FIG. 1 is a schematic view of a laundry treating appliance according to a first embodiment of the invention. The laundry treating appliance may be any appliance which performs a cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a drum 16 provided within the tub 14, the drum 16 defining at least a portion of a laundry treating chamber 18. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It is also within the scope of the invention for the laundry holding system to comprise only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single and bulk dispenser. Non-limiting examples of suitable dispensers are disclosed in U.S. Pub. No. 2010/0000022 to Hendrickson et al., filed Jul. 1, 2008, entitled "Household Cleaning Appliance with a Dispensing System Operable Between a Single Use Dispensing System and a Bulk Dispensing System," U.S. Pub. No. 2010/0000024 to Hendrickson et al., filed Jul. 1, 2008, entitled "Apparatus and Method for Controlling Laundering Cycle by Sensing Wash Aid Concentration," U.S. Pub. No. 2010/0000573 to Hendrickson et al., filed Jul. 1, 2008, entitled "Apparatus and Method for Controlling Concentration of Wash Aid in Wash Liquid," U.S. Pub. No. 2010/0000581 to Doyle et al., filed Jul. 1, 2008, entitled "Water Flow Paths in a Household Cleaning Appliance with Single Use and Bulk Dispensing," U.S. Pub. No. 2010/0000264 to Luckman et al., filed Jul. 1, 2008, entitled "Method for Converting a Household Cleaning Appliance with a Non-Bulk Dispensing System to a Household Cleaning Appliance with a Bulk Dispensing System," U.S. Pub. No. 2010/0000586 to Hendrickson, filed Jun. 23, 2009, entitled "Household Cleaning Appliance with a Single Water Flow Path for Both Non-Bulk and Bulk Dispensing," and application Ser. No. 13/093,132, filed Apr. 25, 2011, entitled "Method and Apparatus for Dispensing Treating Chemistry in a Laundry Treating Appliance," which are herein incorporated by reference in full.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, anti-bacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88, which may be directly coupled with the drum 16 through a drive shaft 90 to rotate the drum 14 about a rotational axis during a cycle of operation. The motor 88 may be a brushless permanent magnet (BPM) motor having a stator 92 and a rotor 94. Alternately, the motor 88 may be coupled to the drum 16 through a belt and a drive shaft to rotate the drum 16, as is known in the art. Other motors, such as an induction motor or a permanent split capacitor (PSC) motor, may also be used. The motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
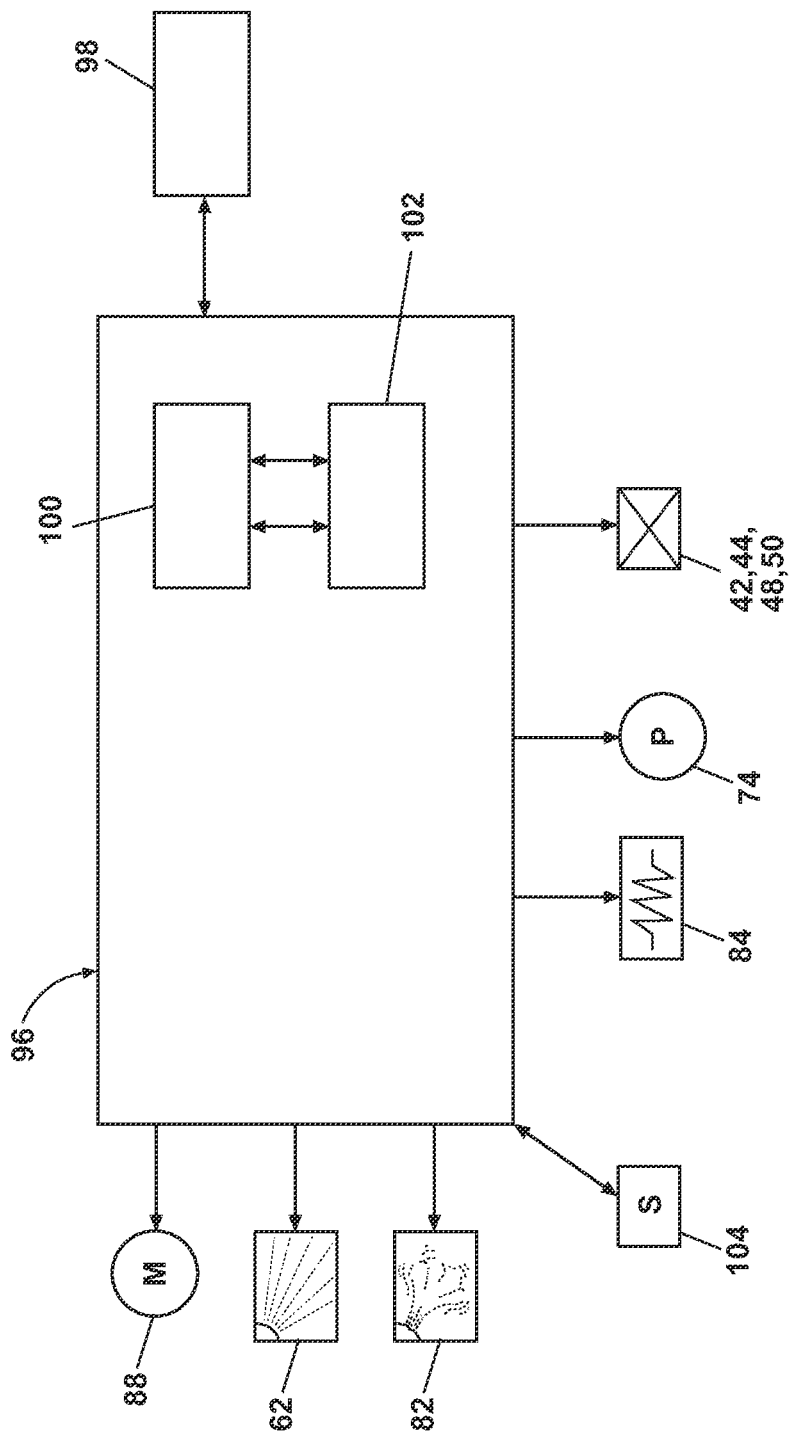
FIG. 2 is a schematic of a control system of the laundry treating appliance of FIG. 1 according to the first embodiment of the invention.

As illustrated in FIG. 2, the controller 96 may be provided with a memory 100 and a central processing unit (CPU) 102.

The memory 100 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor and a motor torque sensor, which may be used to determine a variety of system and laundry characteristics, such as laundry load inertia or mass.

In one example, one or more load amount sensors 106 may also be included in the washing machine 10 and may be positioned in any suitable location for detecting the amount of laundry, either quantitative (inertia, mass, weight, etc.) or qualitative (small, medium, large, etc.) within the treating chamber 18. By way of non-limiting example, it is contemplated that the amount of laundry in the treating chamber may be determined based on the weight of the laundry and/or the volume of laundry in the treating chamber. Thus, the one or more load amount sensors 106 may output a signal indicative of either the weight of the laundry load in the treating chamber 18 or the volume of the laundry load in the treating chamber 18.

The one or more load amount sensors 106 may be any suitable type of sensor capable of measuring the weight or volume of laundry in the treating chamber 18. Non-limiting examples of load amount sensors 106 for measuring the weight of the laundry may include load volume, pressure, or force transducers which may include, for example, load cells and strain gauges. It has been contemplated that the one or more such sensors 106 may be operably coupled to the suspension system 28 to sense the weight borne by the suspension system 28. The weight borne by the suspension system 28 correlates to the weight of the laundry loaded into the treating chamber 18 such that the sensor 106 may indicate the weight of the laundry loaded in the treating chamber 18. In the case of a suitable sensor 106 for determining volume it is contemplated that an IR or optical based sensor may be used to determine the volume of laundry located in the treating chamber 18.

Alternatively, it has been contemplated that the washing machine 10 may have one or more pairs of feet 108 extending from the cabinet 12 and supporting the cabinet 12 on the floor and that a weight sensor (not shown) may be operably coupled to at least one of the feet 108 to sense the weight borne by that foot 108, which correlates to the weight of the laundry loaded into the treating chamber 18. In another example, the amount of laundry within the treating chamber 18 may be determined based on motor sensor output, such as output from a motor torque sensor. The motor torque is a function of the inertia of the rotating drum and laundry. There are many known methods for determining the load inertia, and thus the load mass, based on the motor torque. It will be understood that the details of the load amount sensors are not germane to the embodiments of the invention and that any suitable method and sensors may be used to determine the amount of laundry.

The previously described washing machine 10 may be used to implement one or more embodiments of the invention. The embodiments of the method of the invention may be used to control the operation of the washing machine 10 to control the speed of the motor 88 to control the movement of the laundry within the laundry treating chamber 18 to provide a desired mechanical cleaning action.

Figure 3:
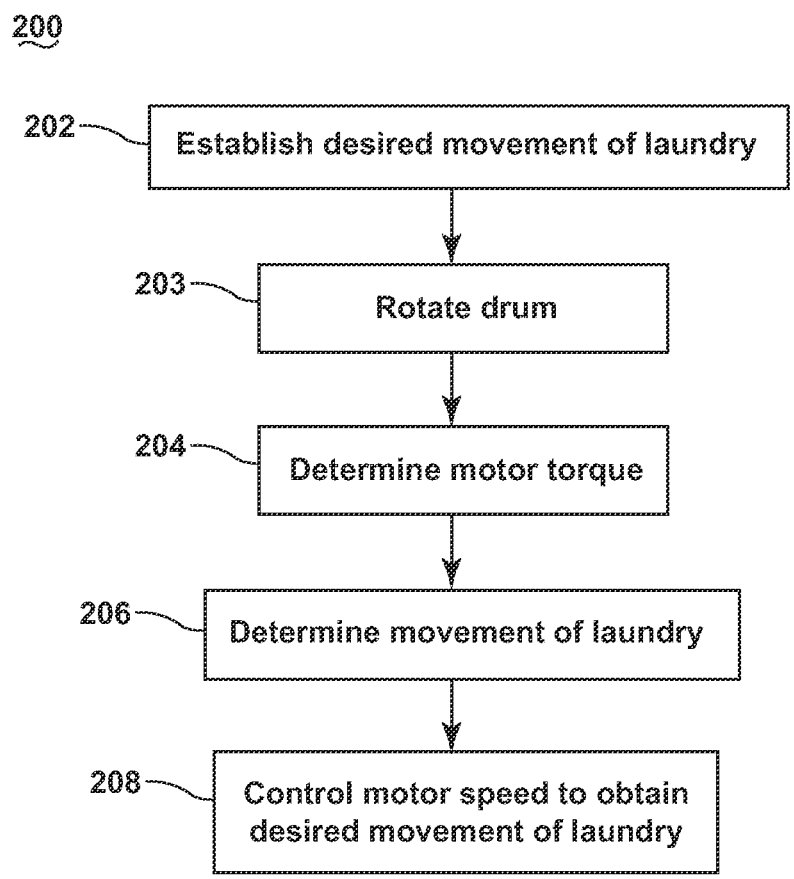
FIG. 3 is a flow chart illustrating a method of controlling a rotational speed of a drum of a washing machine according to a second embodiment of the invention.

Referring now to FIG. 3, a flow chart of a method 200 for controlling the speed of the motor 88 to control the rotational speed of the drum 16 in the washing machine 10 is illustrated. The sequence of steps depicted for this method and the proceeding methods are for illustrative purposes only, and is not meant to limit any of the methods in any way as it is understood that the steps may proceed in a different logical order or additional or intervening steps may be included without detracting from the invention.

The method 200 starts with assuming that the user has placed one or more laundry articles for treatment within the treating chamber 18 and selected a cycle of operation through the user interface 98. The method 200 may be implemented during any portion of a cycle of operation or may be implemented as a separate cycle of operation. At 202, the controller 96 may establish a desired movement of the laundry within the treating chamber 18. At 203, the controller 96 may provide a speed control signal to the motor 88 to control the rotational speed of the drum 16. At 204, the controller 96 may receive one or more signals from the motor 88 to determine the motor torque during rotation of the drum 16 at 203. At 206, the controller 96 may use the determined motor torque to determine the movement of the laundry within the laundry treating chamber 18. At 208, the controller 96 may provide one or more additional speed control signals to the motor 88 to control the rotational speed of the drum 16 to obtain the desired movement of the laundry. The method 200 may be repeated one or more times continuously or intermittently throughout the course of a cycle of operation or one or more phases of a cycle of operation, such as a washing phase or rinsing phase, for example.

Establishing the desired movement of the laundry at 202 may be based on imparting a desired amount of mechanical energy to the laundry during the cycle of operation. The amount of mechanical energy may be determined manually, such as by the user through the user interface, and/or automatically, based on the selected cycle of operation and one or more settings for the cycle of operation, such as the amount of laundry, which may include liquid absorbed by the laundry and/or the fabric type of laundry, for example. For example, a normal wash cycle may apply more mechanical energy to the laundry than a delicate cycle. As used herein, liquid absorbed by the laundry includes liquid carried by the laundry fabric and liquid carried within folds or pockets of the laundry articles.

The amount of laundry may be qualitative or quantitative and may be determined manually based on user input through the user interface 98 or automatically by the washing machine 10. For example, a qualitative determination of the laundry amount may include determining whether the laundry is a small, medium or large load. A quantitative determination may include determining a weight or volume of the laundry within the treating chamber 18. The amount of laundry may be determined automatically in any of the previously described methods, such as using a weight sensor, or based on sensor output from the motor 88. The manner in which the amount of laundry is determined is not germane to the embodiments of the invention.

The type of laundry may be determined manually based on user input through the user interface 98 or automatically by the washing machine 10. Non-limiting examples of types of laundry include cotton, silk, polyester, delicates, permanent press and heavy duty. In one example, the controller 96 may determine the type of laundry based on the cycle of operation selected by the user and optionally one or more settings of the cycle of operation selected by the user. Alternatively, one or more sensors may be used to determine the type of laundry. The manner in which the type of laundry is determined is not germane to the embodiments of the invention.

The desired movement of the laundry may be categorized into one or more of several categories of movement known in the art. Non-limiting examples of movement categories include tumbling, rolling, sliding and satellizing. These are terms of art that may be used to describe the motion of some or all of the items forming the laundry load. However, not all of the items forming the laundry load need exhibit the motion for the laundry load to be described accordingly.

A brief description of each motion will be useful in understanding the term. Tumbling, also referred to as lift and drop, is a condition in which the laundry may be lifted by the rotating drum 16 from a lower position, generally near or at the bottom of the drum 16, to a raised position, above the lower position, where the laundry is no longer being lifted by the drum 16 and falls within the drum 16, generally toward the bottom of the drum 16. The rotation of the laundry articles with the drum 16 may be facilitated by the baffles 22. During tumbling, the individual laundry articles may move relative to one another such that the articles may rub against each other and may fall onto each other as they fall to the lower position of the drum 16. This may generate article-to-article friction, which may provide mechanical cleaning action to the laundry articles.

Rolling, also referred to as balling, is a condition in which the laundry may not be lifted by the drum 16 as the drum 16 rotates, such as occurs during tumbling, but rolls or rotates while part of the laundry may still be in contact with the interior surface of the drum 16 and/or the lifter 22. In this condition, a frictional force may be present that causes the laundry to move in a rolling or folding manner with little or no motion above its horizontal position in the drum 16. Rolling may occur with laundry items that are too large or heavy to be lifted by the drum 16 or when a laundry item becomes entangled with another item.

Sliding is another condition in which the laundry may not be lifted by the drum 16 as the drum rotates, such as occurs during tumbling, but may remain at or near the bottom of the drum 16. Sliding differs from rolling in that the laundry does not move in a rolling or folding manner, rather, it slides off the inner surface of the drum 16 as the drum 16 rotates, generally exposing the same face of the laundry to the liquid in the washing machine 10.

Satellizing is a condition in which the laundry may be held by centrifugal force against the inner surface of the drum 16 as the drum 16 rotates. During satellizing, the motor 88 may rotate the drum 16 at rotational speeds, i.e. a spin speed, wherein the laundry items creating the laundry load in the treating chamber 18 are held against the inner surface of the drum 16 and rotate with the drum 16 without falling. This is known as the laundry being satellized or plastered against the drum 16. Typically, the force applied to the laundry items at the satellizing speeds is greater than or about equal to 1G. For a horizontal axis washing machine 10, the drum 16 may rotate about an axis that may be inclined relative to the horizontal, in which case the term "1G" refers to the vertical component of the centrifugal force vector, and the total magnitude along the centrifugal force vector would therefore be greater than 1G.

Each movement category may have one or more subcategories based on the corresponding rotational speed of the drum 16 and/or the amount of mechanical energy imparted to the laundry. Each movement category and/or subcategory may correspond to a cleaning mode that may be provided to the laundry during a cycle of operation.

The controller 98 may control the speed of the motor 88 to rotate the drum 16 at 203 at a default speed based on the cycle of operation and one or more automatic or manually selected settings, such as the amount or type of laundry. The default speed may be based on the speed that typically results in the desired movement of the laundry for a load of laundry having a standard amount and/or a default type and may be determined empirically or experimentally. Alternatively, the default speed may not correspond to a desired movement, but rather correspond to a predetermined speed for initiating the method 200. There may be a single default speed or a plurality of default speeds based on the selected cycle of operation and/or one or more settings, such as the amount of laundry or the type of laundry.

At 204, the motor torque may be determined using a motor torque sensor and the motor torque sensor may output a motor torque signal to the controller 96. The controller 96 may use one or more characteristics of the motor torque signal, such as the amplitude and frequency of oscillations in the motor torque signal at 206 to determine the movement of the laundry. FIGS. 4-6 illustrate exemplary torque signals and drum speed signals corresponding to different movement categories. The data in FIGS. 6-8 may not be indicative of actual data, but is included for the purposes of illustration.

FIG. 4 illustrates an exemplary motor torque signal 110 and drum speed 112 over time corresponding to a rolling movement. As illustrated schematically in FIG. 4, during rotation of the drum 16, a laundry article 114 rolls or rotates while part of the laundry article 114 maintains contact with drum 16, but is generally not lifted above its position near a bottom of the drum 16. During a phase in which the drum speed 112 is increasing from 0 to a speed 116, the motor torque signal 110 is also increasing. A non-limiting example of a suitable speed 116 is 28 rpm. Once the drum speed reaches the speed 116, the drum speed 112 plateaus and the motor torque signal 110 begins to oscillate or ripple. The frequency 118 of the oscillations and the amplitude 120 of the oscillations may be indicative of the rolling movement of the article 114 in drum 16. The frequency 118 and amplitude 120 of the oscillations indicative of a rolling movement are greater than the frequency and amplitude of oscillation indicative of a sliding movement.

FIG. 5 illustrates an exemplary motor torque signal 122 and drum speed 124 over time corresponding to a tumbling movement. As illustrated schematically in FIG. 5, during rotation of the drum 16, the laundry article 114 may be lifted by the baffles 22 from a position near the bottom of the drum 16 to a raised position, where the article 114 is no longer being lifted by the drum 16 and falls within the drum 16, generally toward the bottom of the drum 16. During a phase in which the drum speed 124 is increasing from 0 to a speed 126, which is higher than the speed 116, the motor torque signal 122 is also increasing. A non-limiting example of a suitable speed 126 is 52 rpm. Once the drum speed reaches the speed 126, the drum speed 124 plateaus and the motor torque signal 122 begins to oscillate or ripple. The frequency 128 and the amplitude 130 of the oscillations of the motor torque signal 122 are greater for the laundry article 114 in a tumbling condition than the frequency 118 and amplitude 120 of the motor torque signal 110 when the laundry article 114 is in a rolling condition, as described above with respect to FIG. 4.

FIG. 6 illustrates an exemplary motor torque signal 132 and drum speed 134 over time corresponding to a satellizing movement. As illustrated schematically in FIG. 6, during rotation of the drum 16 at a satellizing speed 136, the laundry article 114 is held by centrifugal force against the inner surface of the drum 16. During a phase in which the drum speed 134 is increasing from 0 to the satellizing speed 136, which is higher than the speed 126, the motor torque signal 132 is also increasing. Once the drum speed reaches the satellizing speed 136, the drum speed 134 plateaus and the motor torque signal 132 also plateaus, with negligible oscillations, indicating the laundry article 114 is in a satellizing movement condition. The frequency and amplitude of oscillations indicative of a satellizing movement condition are lower than the frequency and amplitude of oscillations indicative of a sliding condition.

The controller 98 may monitor the motor torque signal during rotation of the drum 16 when the drum 16 is rotated at a constant speed and determine the frequency and amplitude of oscillations in the motor torque signal. The frequency and amplitude of oscillations in the motor torque signal may be determined after a predetermined period of time after the drum 16 starts to rotate, after the drum 16 reaches a predetermined speed, or after a rate of change in the speed of the drum 16 reaches a predetermined threshold. The motor torque signal may be monitored continuously or intermittently during rotation of the drum 16. The frequency and amplitude of the oscillations may be determined using any known mathematical algorithm, and may be based on a single measurement or multiple measurements in which an average frequency and/or amplitude is determined.

In one example, the frequency may be determined by measuring the time period between successive maximum and minimums in the motor torque signal. In another example, at least a portion of the motor torque signal may be fit to an equation and the frequency determined by the controller 98 from the equation. The amplitude of the motor torque oscillations may similarly be determined based on the fit of at least a portion of the motor torque signal to an equation. In another example, the amplitude may be determined by determining the difference or an average difference between a maximum and minimum of the torque signal. In another example, the frequency and amplitude of the motor torque oscillations may be determined by converting the motor torque data from the time domain to the frequency domain according to any known mathematical method, such as a Fast Fourier Transform (FFT). One such method is that described in U.S. Patent Publication 20100263136, entitled "Method and Apparatus for Determining Laundry Load Size," filed Apr. 16, 2009 and assigned to the present assignee. One or more filters or data smoothing algorithms may be applied to the motor torque signal to aid in analysis of the signal, as is known in the art.

Once the frequency and amplitude of the motor torque signal have been determined, the controller 98 may compare the determined frequency and amplitude to a pair of frequency and amplitude reference values to determine the movement of the laundry. A plurality of frequency and amplitude reference values may be determined empirically or experimentally and stored in the memory 100 of the controller 98. The reference values may be stored in a look-up table of corresponding movement categories that the controller 98 may consult. In another example, the plurality of frequency and amplitude reference values may be used with one or more functions for determining the movement category of the laundry. The determined frequency and amplitude values may be plugged into the function(s) as input and used to generate an output that corresponds to the movement category of the laundry.

At 208, the controller 98 may use the determined movement of the laundry at 206 to control the motor speed to obtain the desired movement of the laundry. The movement condition of a load of laundry at a given drum rotation speed may vary depending on the characteristics of the load. Characteristics such as the amount of the laundry, the volume of the laundry, the amount of liquid absorbed by the laundry and the fabric type of the laundry may effect the movement of the laundry at a given drum rotational speed. The controller 98 may increase or decrease the rotational speed of the drum 16 depending on the determined movement category of the laundry at 206 to obtain the desired movement.

For example, the controller 98 may be programmed with a motor control algorithm for determining how to change the drum rotational speed to obtain the desired movement based on the determined movement and characteristics of the laundry load. The drum rotational speed, determined movement and one or more characteristics of the laundry load, such as amount or fabric type, may be input into the motor control algorithm and the algorithm may provide an output signal corresponding to either an increase in drum rotational speed or a decrease in rotational speed. It is also within the scope of the invention for the determined frequency and amplitude to be input directly into the motor control algorithm without determining the movement of the laundry. The motor control algorithm output may correspond to a desired speed setting and the motor 88 may control the drum 16 to rotate at the desired speed setting. Alternatively, the motor control algorithm output may correspond to incrementally accelerating or decelerating the drum rotational speed. The method 200 may be initiated one or more times during a speed plateau in the acceleration/deceleration of the drum 16 to determine when the determined movement of the laundry corresponds to the desired movement of the laundry.

The method 200 provides a method in which the controller 98 may determine the movement of the laundry within the drum 16 in real time and adjust the rotational speed of the drum 16 to provide a desired movement of the laundry. In this manner, because the movement of the laundry correlates with the mechanical action imparted to the laundry, the rotational speed of the drum 16 may be adjusted during a cycle of operation to provide each laundry load with the desired amount and sequencing of mechanical action based on the selected cycle of operation and various settings.

Figure 7:
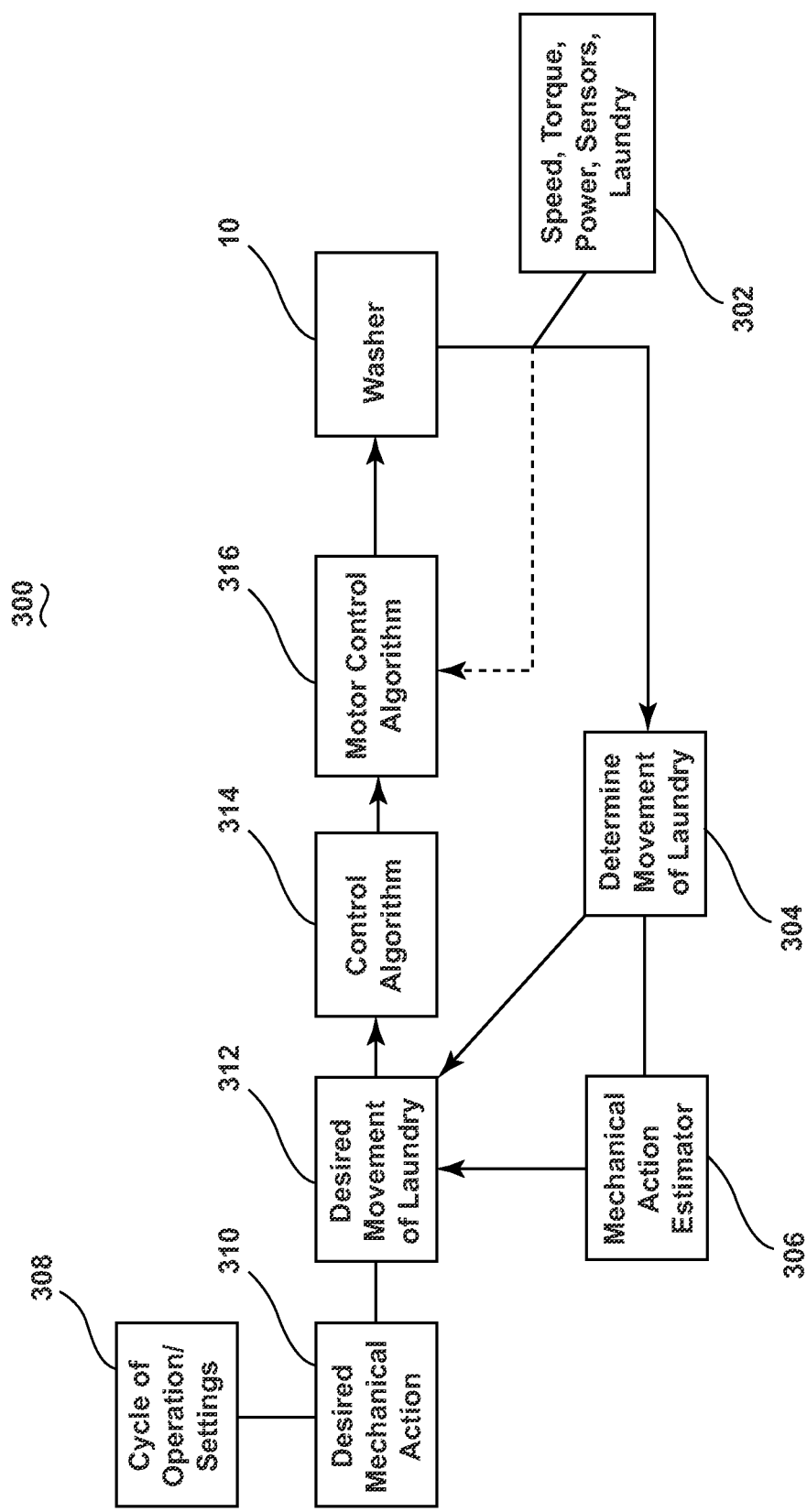
FIG. 7 is a schematic of a control system for controlling a rotational speed of a drum in a washing machine according to according to a sixth embodiment of the invention.

FIG. 7 illustrates a control system 300 that may be used to control the rotation of the drum 16 to impart the desired amount and sequencing of the mechanical action imparted to the laundry load based on the user selected cycle of operation and/or settings to provide the desired treating performance. While the control system 300 is illustrated as a closed loop feedback system, it is also within the scope of the invention for the control system 300 to be an open loop system. The control system 300 may be used in combination with the method 200 of FIG. 3 for determining the movement of the laundry. It is also within the scope of the invention for other methods of determining the movement of the laundry to be used with the control system 300.

Information 302 about the laundry load and one or more components of the washing machine 10, non-limiting examples of which include the rotational speed of the drum 16, motor torque, motor power, drum acceleration, sensor information, and characteristics of the laundry load, may be used to determine the movement of the laundry 304 using the method 200 of FIG. 3, for example. The determined movement of the laundry 304 may be used by a mechanical action estimator 306 to estimate the mechanical action imparted to the laundry load. The mechanical action estimator 306 may determine a cumulative amount of mechanical action over a predetermined period of time and/or a magnitude of mechanical action at a specific time.

The selected cycle of operation and any automatic or manually selected settings 308 may be used to determine the desired mechanical action 310 to be imparted to the laundry, which may be used to determine the desired movement of the laundry 312. The desired movement of the laundry 312 and the determined movement of the laundry 304 may be provided as input to a control algorithm 314 to determine how to change the drum rotational speed so that the determined movement of the laundry 304 satisfies the desired movement of the laundry 312. The determined mechanical action may also be provided to the control algorithm 314 by the mechanical action estimator 306. The control algorithm 314 may provide as output to a motor control algorithm 316 a desired movement of the drum 16, such as speed, duration and direction of rotation of the drum 16. The motor control algorithm 316 may use the control algorithm output as well as the information 302 to determine how to control the motor 88 to provide the desired movement of the drum 16 during one or more phases of the selected cycle of operation.

The control system 300 may be used to control the motor 88 to rotate the drum 16 to provide the desired movement and mechanical action to the laundry. Using the closed loop feedback control system 300, the control of the motor 88 may be adapted during the cycle of operation to account for changes in the system, such as changes in weight as liquid is absorbed or extracted from the laundry, or changes in the power consumption of the motor 88, to provide the desired movement and mechanical action to the laundry. In this manner, the control system 300 may maintain the laundry in the desired movement category so as to provide the desired treatment outcome based on the selected cycle of operation.

For example, a selected cycle of operation may correspond to a predetermined cumulative amount and/or magnitude of mechanical action to be imparted to the laundry. The control system 300 may be used to control the motor 88 to rotate the drum 16 to move the laundry according to a plurality of movement categories to provide the desired mechanical action corresponding to the selected cycle of operation. The sequencing and duration of the different movement categories, such as rolling, tumbling and satellizing, may be controlled in real time based on the inputs into the closed loop feedback control system 300 at different points during the cycle of operation. The mechanical action estimator 306 may be used to monitor the cumulative amount and/or magnitude of mechanical action imparted to the laundry and the control system 300 may use the estimated mechanical action to adjust the control of the motor 88 to provide the desired cumulative amount and/or magnitude of mechanical action.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method for operating a laundry treating appliance having a drum at least partially defining a treating chamber for receiving laundry for treatment, a motor operably coupled to and rotating the drum, a controller coupled to and controlling the motor, and a user interface operably coupled to the controller, wherein the controller controls the motor according to a cycle of operation selected via the user interface, the method comprising:
    establishing a desired movement of the laundry within the treating chamber;
    controlling the speed of the motor to control the rotational speed of the drum by the controller providing a speed control signal to the motor;
    receiving by the controller a torque signal indicative of the torque of the motor;
    monitoring by the controller of an amplitude and a frequency of a ripple in the torque signal;
    determining by the controller a category of movement of the laundry from a predetermined group of movement categories by comparing the monitored amplitude and frequency to corresponding pairs of amplitude and frequency reference values for each of the movement categories, the movement categories selected from the group consisting of sliding, rolling, tumbling, and satellizing; and
    controlling by the controller the speed of the motor until the determined category of movement of the laundry satisfies the desired movement of the laundry.

2. The method of claim 1 wherein establishing the desired movement of the laundry is based on an amount of mechanical action to be imparted to the laundry.

3. The method of claim 2 wherein establishing the amount of mechanical action is based on a cycle of operation selected via the user interface or a fabric type of the laundry.

4. The method of claim 3 wherein establishing the amount of mechanical action is based on both of a cycle of operation selected via the user interface and a fabric type of the laundry.

5. The method of claim 1 wherein establishing the desired movement is based on a cycle of operation selected via the user interface or a fabric type of the laundry.

6. The method of claim 5 wherein establishing the desired movement is based on a cycle of operation selected via the user interface and at least one of a fabric type of the laundry, an amount of laundry, an amount of laundry and absorbed liquid, or combinations thereof.

7. The method of claim 1 wherein the movement categories comprise at least three of sliding, rolling, tumbling, or satellizing.

8. The method of claim 7 wherein the movement categories comprise at least sliding, rolling, tumbling, and satellizing.

9. The method of claim 7 wherein the rolling movement category has a greater amplitude and a greater frequency than the sliding movement category.

10. The method of claim 9 wherein the tumbling movement category has a greater amplitude and a greater frequency than the rolling movement category.

11. The method of claim 10 wherein the satellizing movement category has a lower amplitude and a lower frequency than the sliding movement category.

* * * * *